(12) United States Patent
Wolk et al.

(10) Patent No.: US 8,499,555 B2
(45) Date of Patent: Aug. 6, 2013

(54) CHARGE-COOLED VALVE

(75) Inventors: Matthew T. Wolk, Peoria, IL (US);
Thomas A. Bevill, Morton, IL (US);
Terry W. Grabb, Washington, IL (US);
Mehdi Mahssini, Rancennes (FR); Paul M. Himmell, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 1289 days.

(21) Appl. No.: 12/222,996

(22) Filed: Aug. 21, 2008

(65) Prior Publication Data
US 2010/0043429 A1 Feb. 25, 2010

(51) Int. Cl.
F02D 23/00 (2006.01)
F16K 49/00 (2006.01)
F16L 53/00 (2006.01)
F01B 31/00 (2006.01)
F15B 15/26 (2006.01)

(52) U.S. Cl.
USPC ............ 60/602; 137/339; 137/340; 92/130 R; 92/135; 92/24; 92/27; 92/28

(58) Field of Classification Search
USPC ........... 60/202, 602; 137/339, 340; 92/130 R, 92/135, 21 R, 24, 27, 28, 115
See application file for complete search history.

(56) References Cited

U.S. PATENT DOCUMENTS

| | | | |
|---|---|---|---|
| 3,195,805 A * | 7/1965 | Cholvin et al. | 60/602 |
| 3,257,796 A * | 6/1966 | Updike | 60/602 |
| 4,084,378 A * | 4/1978 | Blake | 60/602 |
| 4,248,047 A * | 2/1981 | Sumi | 60/602 |
| 4,251,050 A * | 2/1981 | McInerney | 60/602 |
| 4,256,019 A * | 3/1981 | Braddick | 92/94 |
| 4,271,672 A * | 6/1981 | Withalm et al. | 60/602 |
| 4,403,538 A * | 9/1983 | Rise | 92/94 |
| 4,404,804 A * | 9/1983 | Tadokoro et al. | 60/602 |
| 4,424,675 A * | 1/1984 | Ojima | 60/602 |
| 4,463,564 A | 8/1984 | McInerney | |
| 4,517,801 A * | 5/1985 | Emonts | 60/602 |
| 4,642,991 A * | 2/1987 | Kawabata | 60/602 |
| 4,646,522 A * | 3/1987 | Mamiya et al. | 60/602 |
| 4,831,993 A | 5/1989 | Kelgard | |
| 5,224,853 A * | 7/1993 | Kazuo et al. | 60/602 |
| 5,787,791 A * | 8/1998 | Vertanen | 92/130 R |
| 6,272,860 B1 * | 8/2001 | Klein et al. | 60/602 |
| 6,276,139 B1 | 8/2001 | Moraal et al. | |
| 6,390,081 B1 | 5/2002 | Novak et al. | |
| 6,604,360 B1 | 8/2003 | Vuk | |
| 6,658,345 B2 | 12/2003 | Miller | |
| 6,658,848 B1 * | 12/2003 | Pierpont | 60/602 |
| 7,155,899 B2 | 1/2007 | Beer et al. | |
| 2001/0017033 A1 | 8/2001 | McKinley et al. | |
| 2002/0173899 A1 | 11/2002 | Miller | |
| 2003/0029168 A1 * | 2/2003 | Hercey et al. | 60/602 |
| 2005/0268890 A1 | 12/2005 | Karem | |
| 2006/0112680 A1 | 6/2006 | Beer et al. | |
| 2006/0237247 A1 | 10/2006 | Severinsky et al. | |
| 2007/0033939 A1 | 2/2007 | Wang et al. | |
| 2007/0119168 A1 | 5/2007 | Turner | |
| 2008/0022679 A1 | 1/2008 | Hara et al. | |

FOREIGN PATENT DOCUMENTS

JP 2005315371 A * 11/2005

* cited by examiner

Primary Examiner — Thai Ba Trieu
(74) Attorney, Agent, or Firm — Finnegan, Henderson, Farabow, Garrett & Dunner LLP

(57) ABSTRACT

A valve for use with a turbocharger is disclosed. The valve may have a valve element movable to selectively direct a flow of fluid. They valve may also have a control portion connected to move the valve element, and a cooling portion configured to receive a pressurized cooling medium from the turbocharger.

15 Claims, 3 Drawing Sheets

CHARGE-COOLED VALVE

TECHNICAL FIELD

The present disclosure is directed to a valve, and more particularly, to a charge-cooled valve.

BACKGROUND

Turbocharged engines often employ bypass devices such as wastegate valves to regulate a turbocharger speed and a resulting boost pressure of air delivered to an intake of the engine. Wastegate valves generally include a valve element disposed within an exhaust system of the engine, and a pneumatic actuator used to move the valve element. The pneumatic actuator selectively moves the valve element to modify a volume of exhaust gases directed into or bypassed around a turbine of the turbocharger. Boost air pressure is directly supplied from a compressor of the turbocharger to the pneumatic actuator to control movement of the connected valve element. As boost air pressure increases, a force of the pneumatic actuator gradually urges the valve element to open, thereby bypassing a greater amount of exhaust around the turbine and lowering turbocharger speed and boost air pressure. As boost air pressure decreases, the pneumatic actuator returns the valve element toward a closed position such that more exhaust passes through the turbine, thereby increasing turbocharger speed and boost air pressure.

Although effective at regulating the speed of the turbocharger and the resulting boost air pressure, wastegate and other pneumatic engine valves can be exposed to very high exhaust temperatures. These temperatures create a harsh environment for the pneumatic actuator and the valve element that may decrease their useful lives.

One attempt to prolong the life of a wastegate valve is described in U.S. Pat. No. 4,463,564 (the '564 patent) to McInerney, issued Aug. 7, 1984. Specifically, the '564 patent discloses a turbine housing assembly for use with a turbocharger having an exhaust gas driven turbine wheel for rotatably driving a compressor impeller. The assembly includes a turbine housing having an exducer passage into which exhaust gases are discharged from the turbine wheel. A bypass passage in the turbine housing and a pivoting wastegate valve cooperate to provide an exhaust ejector for drawing gases through the exducer passage. The turbine housing further includes a vent for circulation of ambient air between the bypass and exducer passages. The air vent improves cooling of the turbine housing between the bypass and exducer passages.

Although the air vent of the '564 patent may improve cooling of the turbine housing, it may be insufficient for some applications. In particular, the use of ambient air, because of its temperature, may be minimally successful at cooling the turbine housing in extreme temperature applications. In addition, the cooling of the turbine housing may have little effect on the temperature of the wastegate valve or an associated actuator that are separated from the turbine housing.

The valve of the present disclosure is directed towards solving one or more of the problems set forth above and/or other problems of the prior art.

SUMMARY

In one aspect, the present disclosure is directed to a valve. The valve may include a valve element movable to selectively direct a flow of fluid. The valve may also have a control portion connected to move the valve element, and a cooling portion configured to receive a pressurized cooling medium from a turbocharger.

In another aspect, the present disclosure is directed to a method for regulating performance of a turbocharger. The method may include directing exhaust through a turbocharger to compress air, and operating a valve to adjust an amount of exhaust passing through the turbocharger based on performance of the turbocharger. The method may also include directing a flow of the compressed air through the valve to cool the valve.

DETAILED DESCRIPTION

Figure 1:
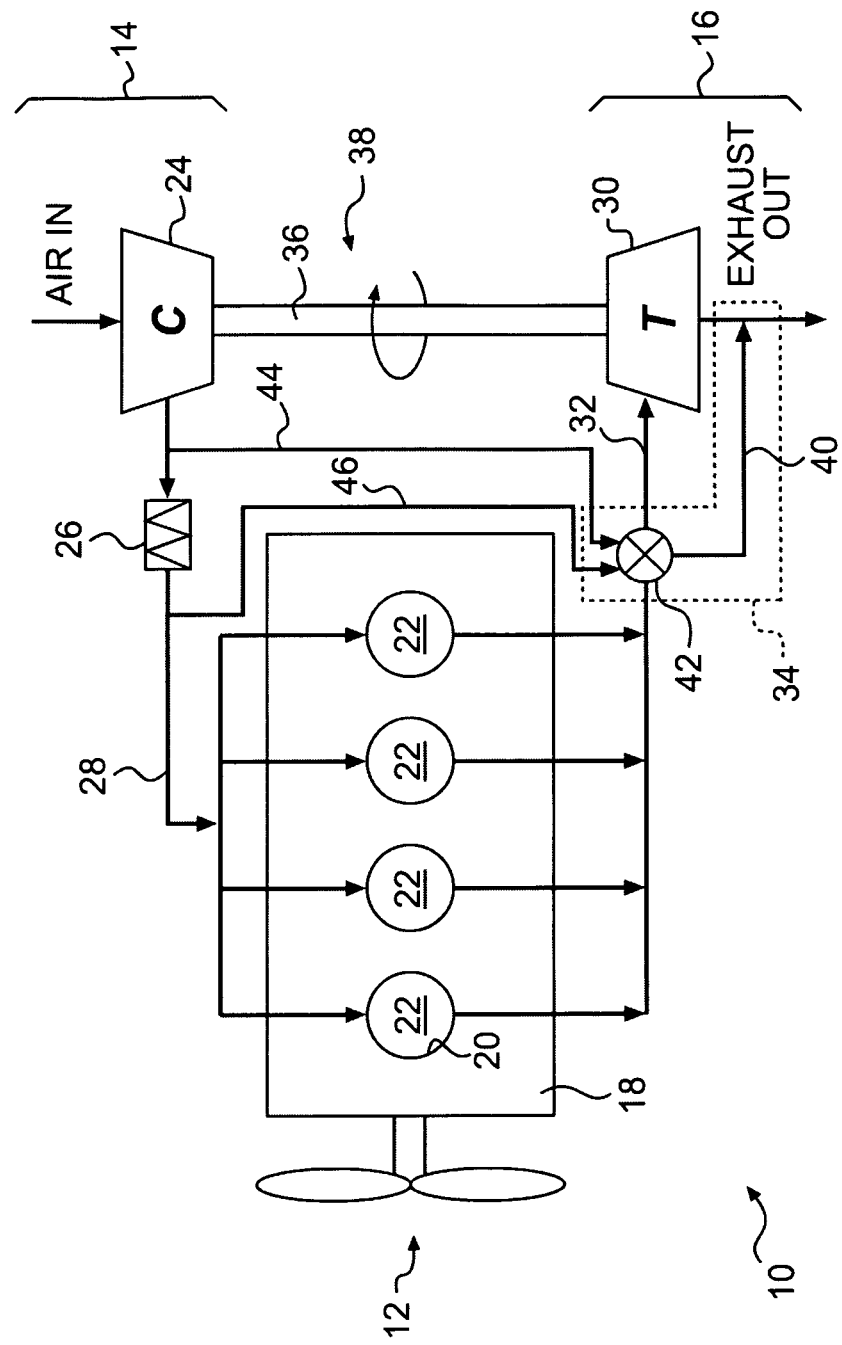
FIG. 1 is a diagrammatic illustration of an exemplary disclosed power system.

FIG. 1 illustrates a power system 10 having a power source 12, an air induction system 14 configured to direct combustion air into power source 12, and an exhaust system 16 configured to direct byproducts of combustion from power source 12 to the atmosphere. For the purposes of this disclosure, power source 12 is depicted and described as a four-stroke diesel engine. One skilled in the art will recognize, however, that power source 12 may be any other type of combustion engine such as, for example, a gasoline or a gaseous fuel-powered engine. Power source 12 may include an engine block 18 that at least partially defines a plurality of cylinders 20. A piston (not shown) may be slidably disposed within each cylinder 20 to reciprocate between a top-dead-center position and a bottom-dead-center position, and a cylinder head (not shown) may be associated with each cylinder 20. Cylinder 20, the piston, and the cylinder head may form a combustion chamber 22. In the illustrated embodiment, power source 12 includes four such combustion chambers 22. However, it is contemplated that power source 12 may include a greater or lesser number of combustion chambers 22 and that combustion chambers 22 may be disposed in an "in-line" configuration, a "V" configuration, or in any other suitable configuration.

Air induction system 14 may include components configured to introduce charged air into power source 12. For example, air induction system 14 may include one or more compressors 24 and an air cooler 26. Compressor 24 may embody a fixed or variable geometry compressor configured to receive atmospheric air and compress the air to a predetermined pressure level before it enters power source 12. Compressor 24 may be connected to power source 12 via a fluid passage 28. Air cooler 26 may be disposed within fluid passage 28, between power source 12 and compressor 24 and embody, for example, an air-to-air heat exchanger, an air-to-liquid heat exchanger, or a combination of both to facilitate the transfer of thermal energy to or from the compressed air directed into power source 12.

Exhaust system 16 may include components configured to direct exhaust from power source 12 to the atmosphere. Specifically, exhaust system 16 may include a turbine 30 fluidly connected to combustion chambers 22 by a passage 32, and a bypass device 34 configured to adjust an amount of exhaust passing through or around turbine 30. It is contemplated that exhaust system 16 may include components in addition to those listed above such as, for example, particulate removing devices, constituent absorbers or reducers, and attenuation devices, if desired.

Turbine 30 may be a fixed or variable geometry turbine configured to drive compressor 24. For example, turbine 30 may be directly and mechanically connected to compressor 24 by way of a shaft 36 to form a turbocharger 38. As the hot exhaust gases exiting power source 12 move through turbine 30 and expand against blades (not shown) therein, turbine 30 may rotate and drive the connected compressor 24 to pressurize inlet air.

Bypass device 34 may include, among other things, a bypass passage 40 and a valve 42. Bypass passage 40 may include an inlet configured to receive exhaust from upstream of turbine 30, and an outlet configured to discharge the exhaust to a location downstream of turbine 30. Valve 42 may be situated within bypass passage 40 to selectively restrict a flow of exhaust passing through bypass passage 40 (i.e., to selectively restrict an amount of exhaust bypassing turbine 30). A control passage 44 may fluidly connect compressor 24 to valve 42, while a cooling passage 46 may connect cooler 26 to valve 42. It is contemplated that, in some embodiments, bypass device 34 may be integral with turbine 30, if desired.

Figure 2:
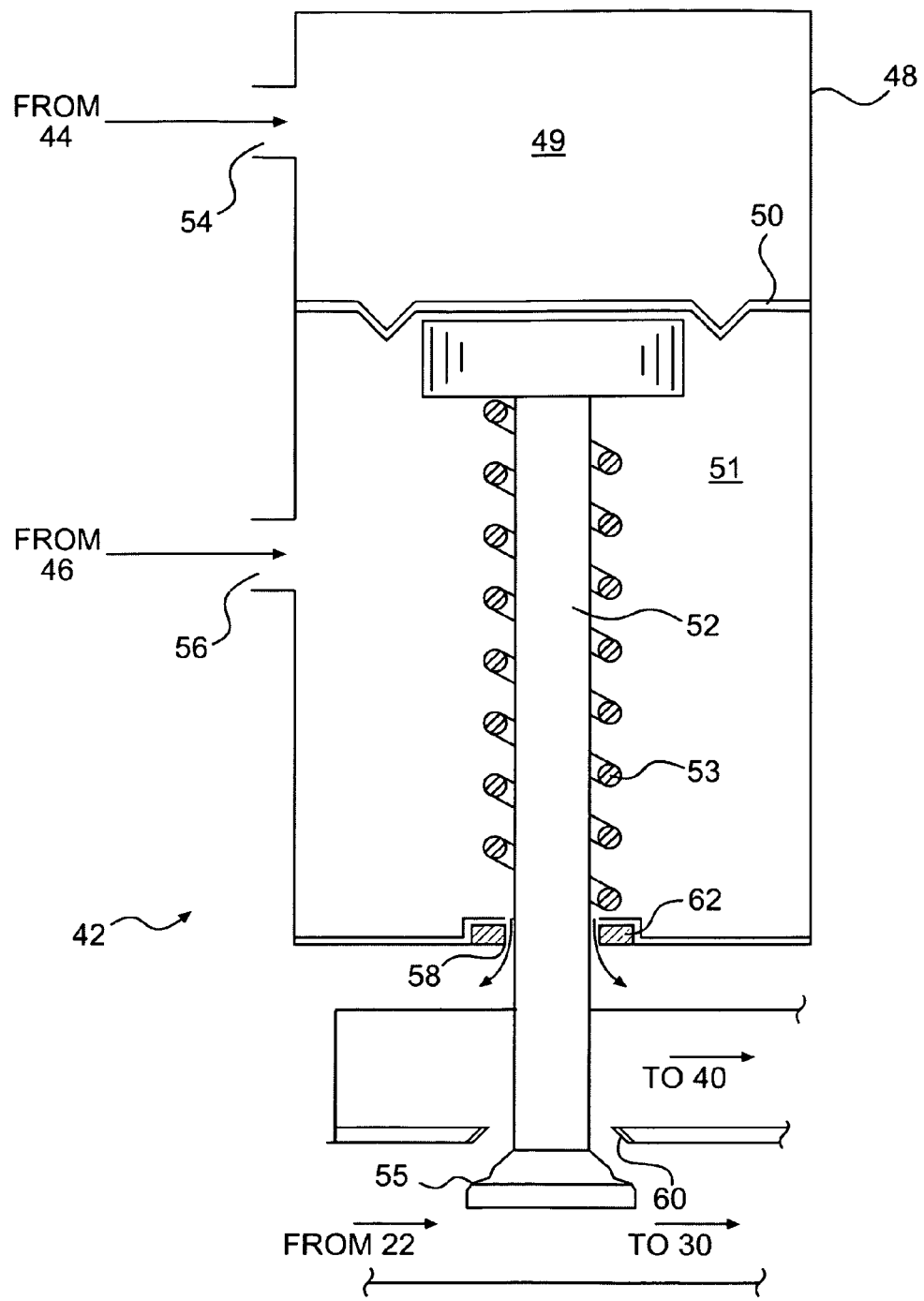
FIG. 2 is a diagrammatic illustration of an exemplary disclosed bypass device that may be used with the power system of FIG. 1.

As illustrated in FIG. 2, valve 42 may be a pneumatic valve, with components driven and cooled by the air pressurized by compressor 24. Specifically, valve 42 may include a housing 48, a diaphragm 50 separating housing 48 into a control portion 49 (e.g., a control chamber) and a cooling portion 51 (e.g., a cooling chamber), a valve element 52 disposed within cooling portion 49 and movable by diaphragm 50, and a resilient member, for example a spring 53, situated to bias valve element 52 toward diaphragm 50. In response to a pressure of control air within control portion 49, valve element 52 may be moved against the bias of spring 53 to pass exhaust from combustion chambers 22 around turbine 30 via bypass passage 40. A cooling medium, for example compressed air, may be directed from downstream of cooler 26 into cooling portion 51 to cool valve 42.

Housing 48 may embody a generally cylindrical vessel having a control inlet 54, a cooling inlet 56, and a cooling outlet 58. Control inlet 54 may be in communication with the pressurized air of compressor 24 via control passage 44. In this configuration, control portion 49 may be maintained at about the same pressure as the air exiting compressor 24. It should be noted that, because control portion 49 may not have a designated outlet (although some air may leak from control portion 49), the air from compressor 24 may not flow through control portion 49, but only act to pressurize control portion 49. As the pressure within control portion 49 acts on diaphragm 50 to generate a force that exceeds a biasing force of spring 53, diaphragm 50 may urge valve element 52 away from a seat 60 to fluidly communicate combustion chambers 22 with bypass passage 40. And, as the pressure within control portion 49 acting on diaphragm 50 reduces below the bias of spring 53, valve element 52 may be returned to inhibit or restrict the flow of exhaust through bypass passage 40.

Cooling inlet 56 may allow air pressurized by compressor 24 to enter cooling portion 51, while cooling outlet 58 may allow the air inside of cooling portion 51 to exit valve 42 to the atmosphere or to other intake or exhaust system components located downstream of turbine 30. In one example, cooling outlet 58 may be formed within a bushing 62 that supports movement of valve element 52. For example, outlet 58 may embody axially arranged grooves (not shown) within an internal annular surface of bushing 62. Because cooling portion 51 may include both an inlet and an outlet, a flow of pressurized air through cooling portion 51 may be maintained during operation of power system 10. And, a size of cooling outlet 58 may be selected such that the pressure within cooling portion 51 may not be allowed to build significantly (i.e., a pressure within cooling portion 51 may be maintained significantly lower than a pressure within control portion 49).

Diaphragm 50, together with control portion 49 and spring 53, may form a pneumatic actuator. That is, when pressurized air is delivered into control portion 49 from compressor 24, as described above, diaphragm 50 may move against the bias of spring 53 to cause actuation of valve element 52. As such, diaphragm 50 may be hermetically sealed against housing 48 such that a separation between the air within control portion 49 and cooling portion 51 may be maintained. It is contemplated that diaphragm 50 may be fixedly connected to valve element 52 or only biased into engagement with valve element 52, if desired.

Although shown as a poppet-type element in FIG. 2, valve element 52 may be any type of element known in the art and capable of moving from a first position, at which exhaust is directed only through turbine 30, toward a second position (shown in FIG. 2), at which some portion of the exhaust may be directed to bypass turbine 30. For example, valve element 52 may be a butterfly-type, a flapper-type, a globe-type, or any other suitable type of element. Valve element 52 may include a sealing surface 55 configured to engage and seal against seat 60 when valve element 52 is moved to the first position. It is contemplated that valve element 52 may be a proportional element capable of moving to any position between the first and second positions to thereby vary an amount of exhaust passing through and around turbine 30, if desired.

Figure 3:
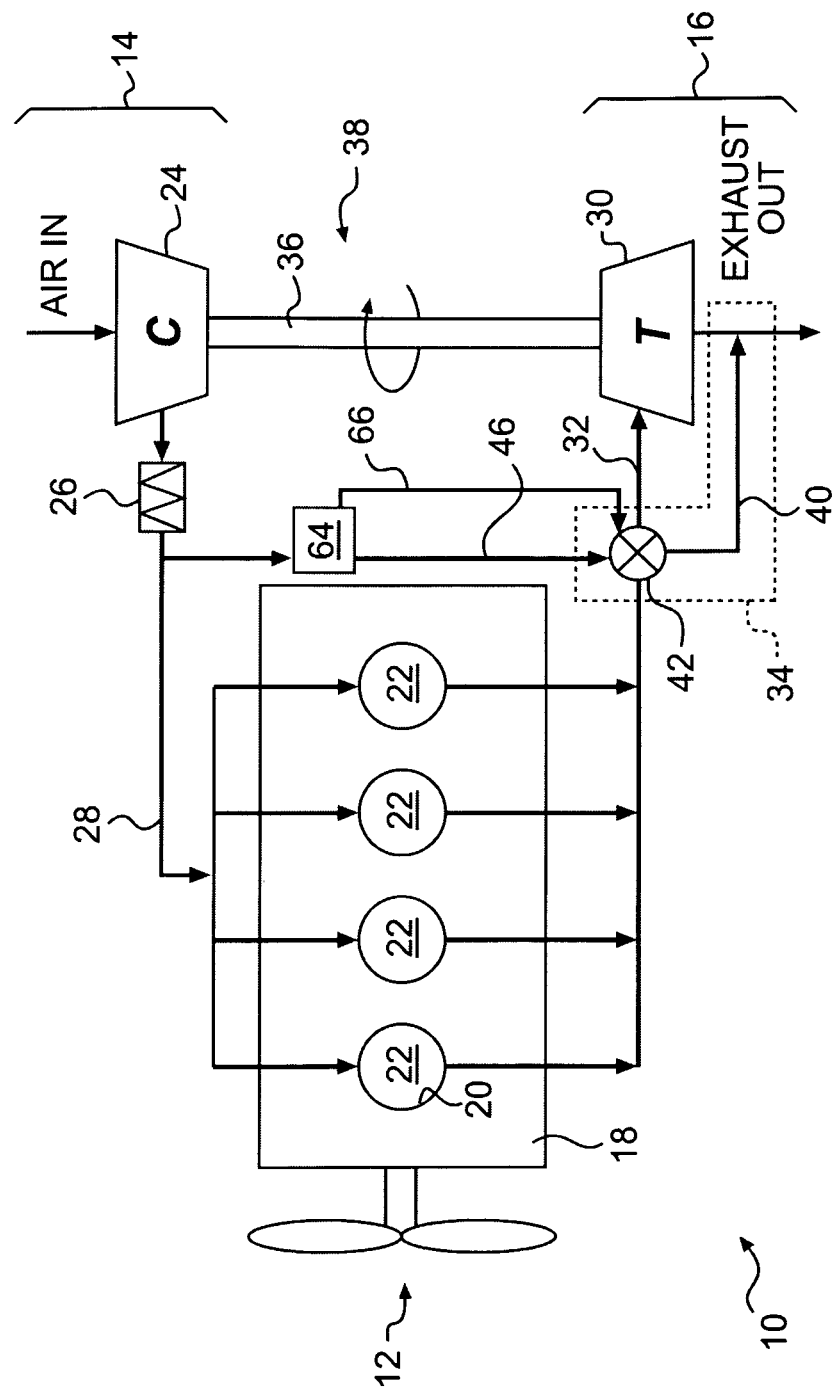
FIG. 3 is a diagrammatic illustration of another exemplary disclosed power system.

In an alternative embodiment illustrated in FIG. 3, bypass device 34 may be electronically controlled. That is, a controller 64 may be associated with bypass device 34 to regulate operation thereof in response to turbocharger performance (e.g., in response to a measured or assumed charge boost air pressure and/or a speed of turbocharger 38). Controller 64 may embody a single or multiple microprocessors, field programmable gate arrays (FPGAs), digital signal processors (DSPs), etc. that include a means for controlling an operation of valve 42 in response to sensed, calculated, and/or assumed performance parameters of turbocharger 38. Numerous commercially available microprocessors can be configured to perform the functions of controller 64. It should be appreciated that controller 64 could readily embody a microprocessor separate from that controlling other non-exhaust related power system functions, or that controller 64 could be integral with a general power system microprocessor and be capable of controlling numerous power system functions and modes of operation. If separate from a general power system microprocessor, controller 64 may communicate with the general power system microprocessor via data links or other methods. Various other known circuits may be associated with controller 64, including power supply circuitry, signal-conditioning circuitry, actuator driver circuitry (i.e., circuitry powering solenoids, motors, or piezo actuators), communication circuitry, and other appropriate circuitry.

Controller 64 may regulate a pressure of the control air supplied to control portion 49 of valve 42 to affect movement of valve element 52. In particular, controller 64 may include or be coupled to a valve mechanism (not shown) disposed within control passage 46 that may be used to selectively restrict and/or relieve a flow of pressurized control air directed to control portion 49. In this manner, even when the boost air pressure provided by compressor 24 would normally not result in a substantial change in the position of valve element 52 (or would result in an undesired change), controller 64 may still be able to regulate operation of valve 42 and performance of turbocharger 38 in a desired manner by selectively changing the air pressure within control potion 49. That is, the pressure of the air directed from controller 64 to valve 42 may be regulated to be different than the pressure of the air supplied to controller 64, if desired.

In one example, controller 64 may be cooled. That is, controller 64 may be located in fluid communication with cooling passage 46 to receive air pressurized by compressor 24 after it has been cooled by cooler 26. In this example, cooling passage 46 may function as both a control air supply and a cooling air supply. Thus, instead of receiving cooling air directly from cooler 26 by way of control passage 44 (illustrated in FIG. 1), valve 42 may instead be configured to receive the cooling air directly from controller 64 by way of a passage 66, as illustrated in FIG. 3. In this configuration, the cooling air from downstream of cooler 26 may first pass through and cool controller 64, before passing through and cooling valve 42. And, the air used to control motion of valve element 52 may also be cooled, thereby enhancing the cooling of valve 42.

INDUSTRIAL APPLICABILITY

The disclosed turbine bypass device may be applicable to any combustion engine having turbocharged air induction. The disclosed turbine bypass device may facilitate turbocharger control with improved component life by providing cooling of the components.

Because the disclosed turbine bypass device may utilize previously cooled air, the cooling thereof may be enhanced. In addition, because the cooled air may be directed to the immediate vicinity of the component requiring cooling, efficiency of the cooling process may be enhanced.

It will be apparent to those skilled in the art that various modifications and variations can be made to the turbine bypass device of the present disclosure without departing from the scope of the disclosure. Other embodiments will be apparent to those skilled in the art from consideration of the specification and practice of the embodiments disclosed herein. For example, although shown in a wastegate application, the disclosed bypass device may be similarly used as an EGR valve to help regulate exhaust gas recirculation, if desired. It is intended that the specification and examples be considered as exemplary only, with a true scope of the disclosure being indicated by the following claims.

What is claimed is:

1. A valve, comprising:
    a valve element movable to selectively direct a portion of a flow of fluid through a turbocharger;
    a housing including a pneumatic control portion and a cooling portion;
    the pneumatic control portion connected to move the valve element; and
    the cooling portion configured to receive a pressurized cooling medium from an air cooler and the turbocharger.

2. The valve of claim 1, wherein the valve element is movable to selectively direct a portion of the flow of fluid through the turbocharger in response to performance of the turbocharger.

3. The valve of claim 2, wherein the valve is associated with a bypass passage having an inlet located upstream of a turbine of the turbocharger, and an outlet located downstream of the turbine, and the valve element is situated within the bypass passage to selectively restrict a flow of exhaust through the bypass passage.

4. The valve of claim 2, wherein the pneumatic control portion is driven by pressurized control air received from the turbocharger.

5. The valve of claim 4, wherein the pressurized cooling medium is air.

6. The valve of claim 5, wherein a pressure of the control air is maintained higher than a pressure of the pressurized cooling medium within the valve.

7. The valve of claim 5, wherein the control portion includes:
    a control chamber in communication with the control air;
    a diaphragm movable by a pressure of the control air; and
    a resilient member configured to resist movement of the diaphragm.

8. The valve of claim 7, wherein the cooling portion includes a cooling chamber separated from the control chamber by the diaphragm.

9. The valve of claim 2, wherein the performance of the turbocharger is one of a speed of the turbocharger and a pressure of air compressed by the turbocharger.

10. The valve of claim 1, wherein the cooling portion includes an inlet configured to receive the pressurized cooling medium, and an outlet configured to discharge the pressurized cooling medium.

11. The valve of claim 10, further including a bushing configured to support movement of the valve element, wherein the outlet includes an opening within the bushing.

12. The valve of claim 1, further including a controller in communication with the control portion, wherein the controller is configured to receive the pressurized cooling medium.

13. The valve of claim 12, wherein the controller is configured to selectively distribute the pressurized cooling medium to the control portion to affect movement of the valve element and to the cooling portion to cool the bypass device.

14. A valve, comprising:
    a valve element movable to selectively direct a flow of fluid through a turbocharger;
    a pneumatic control portion connected to move the valve element and driven by pressurized control air received from a turbocharger; and
    a cooling portion configured to receive a pressurized cooling medium from the turbocharger;
    wherein the control portion includes a control chamber in communication with the control air, and a diaphragm movable by a pressure of the control air; and
    wherein the cooling portion includes a cooling chamber separated from the control chamber by the diaphragm.

15. The valve claim 14, wherein the pressurized cooling medium is air.

\* \* \* \* \*